Patented Feb. 15, 1949

2,461,509

UNITED STATES PATENT OFFICE 2,461,509

PROCESS FOR MAKING TERTIARY ALKYL AMIDES

Mortimer T. Harvey, South Orange, N. J., and Solomon Caplan, New York, N. Y., assignors to Harvel Research Corporation, a corporation of New Jersey No Drawing. Application October 12, 1946, Serial No. 702,890

7 Claims. (Cl. 260—558).

The present invention relates to chemical compounds and to methods and steps of making and using the same.

The present application is a continuation in part of our copending application Serial No. 347,493, filed July 25, 1940, now abandoned, which copending application was a continuation in part of our applications Serial No. 202,230, filed April 15, 1938, now U. S. Patent 2,247,495, and Serial No. 217,220, filed July 2, 1938, now abandoned.

The compounds of the present invention are mono-tertiary-hydrocarbon amides which have the general formula R—R¹ in which R represents a tertiary alkyl group preferably having 4-6 carbon atoms and connected to and replacing a hydrogen atom of an amino group of R¹ which represents an amide of a class consisting of oxamide, acetamide and benzoic acid amide. Each of these various novel compounds has the radicle CONHR in which R is a tertiary alkyl group preferably of 4 to 6 carbon atoms.

The chemical compounds of the present invention can be made by reacting a tertiary hydrocarbon alcohol with one of said amides in the presence of a mineral acid condensing agent such as phosphoric acid, sulphuric acid and so on.

Illustrative examples of the products and the practice of the methods of the present invention are as follows:

*Example 1.*—About twelve grams of benzamide and fifteen cubic centimeters of concentrated sulphuric acid were shaken together at room temperature and then heated a little to obtain a clear solution. This solution was cooled to room temperature and about forty grams of tertiary butyl alcohol added gradually. The first five cubic centimeters of the tertiary butyl alcohol caused the mixture to solidify. As the remainder of the tertiary butyl alcohol is added, in small increments, the mixture was stirred and cooled to below about 25 C. and kept at room temperature. The completed mixture was allowed to stand overnight at room temperature and then neutralized by the addition of sodium hydroxide solution and filtered. The resulting white precipitate was washed with water, and dried. The melting point of this white precipitate is found to be 115° C. Said precipitate has said general formula R—R¹ and specifically

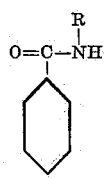

in which R is C₄H₉.

*Example 2.*—About one-quarter mole (22 grams) of oxamide and one mole (50 cc.) of sulphuric acid, concentrated, were heated together to about 60° C. to get a clear solution which was cooled to room temperature. To this clear solution about one mole (74 grams) of tertiary butyl alcohol was added gradually. The first addition of tertiary butyl alcohol caused precipitation of a white solid and as the addition of the tertiary butyl alcohol was continued more of the white solid separated until the mixture was a thick paste. There was also a separation of water insoluble liquid. The mixture was left to stand at room temperature overnight and then poured into a solution of 75 grams of NaOH in 500 cc. of water. This gave a white precipitate which was filtered off. The water insoluble liquid also gave a white solid on evaporation. The combined solids were washed with water and dried. This product is insoluble in water but soluble in ethyl ether. Oxamide itself is insoluble in ethyl ether. The melting point of this product is 170° C. This product has said general formula R—R¹ and specifically

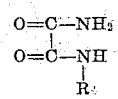

in which R is C₄H₉.

*Example 3.*—About one hundred grams of concentrated sulphuric acid was added gradually, in small portions, with cooling and stirring, to about thirty grams of acetamide. A clear solution resulted. One hundred grams of tertiary butyl alcohol were added gradually, with cooling. In both these coolings the temperature was kept below about 25° C. and at room temperature. The solution was still clear. This was allowed to stand overnight and was then diluted by pouring into 300 cc. of water. The solution was neutralized by the addition of calcium carbonate. The precipitated calcium sulphate was removed by filtration and the filtrate was evaporated by dryness and a batch of crystals remained from the evaporated filtrate. These crystals were shaken with ethyl alcohol, the mixture filtered and the alcohol removed from this second filtrate by evaporation in an oven at 100° C. The resulting crystalline mass is water soluble and has a melting point of 63° C. The melting point of acetamide is 79° C. This product has said general formula R—R¹ and specifically

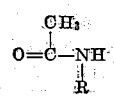

in which R is C₄H₉.

It is noted that in making the mixture of the amide and sulphuric acid, the amide can be added to the sulphuric acid or the sulphuric acid can be added to the amide, the addition being made gradually and the temperature kept below 70° C., also it is made of record and set forth as an advantageous step in the practice of the present invention that greater yields of the reaction products are obtained by keeping the temperature of making the amide-sulphuric acid mixture and the addition of the tertiary alkyl alcohol to the amide-sulphuric acid mixture between about 15° C. and about 25° C. Also it is noted that the amide and the tertiary alcohol used can be mixed together first and the sulphuric acid added to this mixture gradually below 70° C. and preferably between about 15° C. and 25° C. Also, the amount of sulphuric acid used is not limited to that given in the illustrative examples, and from about one-half mole to more than two moles can be used but the lower quantities of sulphuric acid give a lower yield of mono-tertiary-alkyl amide. Two moles of sulphuric acid in the illustrative example gave a substantial yield.

In the examples and in the general descriptions set forth above the reaction temperature is stated generally as being below about 70° C. and particular examples recite an operating temperature between about 15° C. and about 25° C. However, these temperatures are given as examples and not as limitations, even though it can be that certain narrow temperature ranges are optimum for the reaction of certain reaction materials, either for quantity of yield, minimum of other products of reaction, ease of operation, or generally for production on an economic basis. The upper limit for reaction in the liquid or solid states at normal pressure can be boiling point of the reagent having the lowest boiling point and the lower limit can be the temperature at which the reagent materials and the condensing or activating agent when mixed together will remain liquid, but there can be exceptions to this as some of the examples tend to indicate. The lower limit then could be stated that at which one of the reagent materials or the condensing agent is liquid. And it is intended that there is nothing herein, aside from specific statements in the claims, to limit the reaction temperature in the operation and practice of the present invention and that there is nothing to limit certain of the claims from reading on reactions in the vapor phase. The invention broadly relates to condensation of said amides and tertiary alcohols to produce mono-tertiary-hydrocarbon amides.

The novel compounds of the present invention may be condensed with aldehydes or other compounds having reactive methylene groups to form resins. Generally 1 to 2 moles of an aldehyde such as formaldehyde may be reacted with one mole of any of these compounds to provide said resins. These novel compounds may be used in the compounding of rubber and may serve as accelerators in the vulcanization of rubber.

We claim:

1. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises reacting in the presence of a mineral acid a tertiary alkyl alcohol with an amide selected from the group consisting of oxamide, acetamide and benzoic acid amide, the alkyl group of said alcohol having 4–6 carbon atoms.

2. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises, at temperatures between about 15° C. and 70° C., reacting a tertiary alkyl alcohol with an amide selected from the group consisting of oxamide, acetamide and benzoic acid amide, in the presence of a mineral acid, the alkyl group of said alcohol having 4–6 carbon atoms.

3. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises making a mixture of a tertiary alkyl alcohol an amide selected from the group consisting of oxamide, acetamide and benzoic acid amide and sulphuric acid at a temperature between about 15° C. and about 70° C., the alkyl group of said alcohol having 4–6 carbon atoms.

4. The method of claim 3 in which the temperature is maintained between about 15° C. and about 25° C.

5. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises, at temperatures between about 15° C. and 70° C., reacting a tertiary alkyl alcohol with benzamide in the presence of a mineral acid, the alkyl group of said alcohol having 4–6 carbon atoms.

6. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises, at temperatures between about 15° C. and 70° C., reacting a tertiary alkyl alcohol with acetamide in the presence of a mineral acid, the alkyl group of said alcohol having 4–6 carbon atoms.

7. The method of making a mono tertiary hydrocarbon amide of the general formula R—R$^1$ in which R represents a tertiary alkyl group of 4 to 6 carbon atoms and connected to and replacing a hydrogen atom of an amino group of R$^1$, in which R$^1$ represents an amide which comprises, at temperatures between about 15° C. and 70° C. reacting a tertiary alkyl alcohol with oxamide in the presence of a mineral acid, the alkyl group of said alcohol having 4–6 carbon atoms.

MORTIMER T. HARVEY.
SOLOMON CAPLAN.

REFERENCES CITED

The following references are of record in the file of this patent:

Freund et al.: "Ber. Deut. Chem. Ges.," vol. 23, (1890), page 2868, and vol. 24, (1891), page 2159.

Scholl et al.: "Liebigs Annalen," vol. 338 (1905), pages 16–19.

Schroeter: "Ber. Deut. Chem. Ges.," vol. 44 (1911), page 1205.

Brander: "Rec. des Trav. Chim. des Pays Bas," vol. 37 (1918), pages 77, 79, 80, 81 and 82.